(12) United States Patent
Chung et al.

(10) Patent No.: US 9,975,795 B2
(45) Date of Patent: May 22, 2018

(54) WASTE PROCESSING METHOD AND APPARATUS

(71) Applicant: R3D3, Inc., Millbrae, CA (US)

(72) Inventors: Kevin Chung, Millbrae, CA (US); David Loo, Millbrae, CA (US); Gary Kaneshiro, Millbrae, CA (US); Alan Kaneshiro, Millbrae, CA (US)

(73) Assignee: R3D3, Inc., Millbrae, CA (US)

( * ) Notice: Subject to any disclaimer, the term of this patent is extended or adjusted under 35 U.S.C. 154(b) by 0 days. days.

(21) Appl. No.: 14/775,690

(22) PCT Filed: Dec. 27, 2013

(86) PCT No.: PCT/US2013/078134
§ 371 (c)(1),
(2) Date: Sep. 12, 2015

(87) PCT Pub. No.: WO2014/143359
PCT Pub. Date: Sep. 18, 2014

(65) Prior Publication Data
US 2016/0023928 A1    Jan. 28, 2016

Related U.S. Application Data

(60) Provisional application No. 61/851,928, filed on Mar. 14, 2013.

(51) Int. Cl.
| | | |
|---|---|---|
| *C02F 3/02* | (2006.01) | |
| *B09B 3/00* | (2006.01) | |
| *C05F 17/00* | (2006.01) | |
| *B01J 20/22* | (2006.01) | |
| *C05F 11/00* | (2006.01) | |
| *C10J 3/72* | (2006.01) | |
| *C10L 5/36* | (2006.01) | |
| *C10L 5/44* | (2006.01) | |
| *F02B 43/10* | (2006.01) | |
| *C02F 3/28* | (2006.01) | |

(52) U.S. Cl.
CPC ............... *C02F 3/02* (2013.01); *B01J 20/22* (2013.01); *B09B 3/00* (2013.01); *C05F 11/00* (2013.01); *C05F 17/00* (2013.01); *C05F 17/0027* (2013.01); *C10J 3/72* (2013.01); *C10L 5/363* (2013.01); *C10L 5/445* (2013.01); *F02B 43/10* (2013.01); *C02F 3/28* (2013.01); *C02F 2203/006* (2013.01); *C10J 2300/0916* (2013.01); *C10L 2290/26* (2013.01); *C10L 2290/30* (2013.01); *Y02E 50/10* (2013.01); *Y02E 50/30* (2013.01); *Y02P 20/145* (2015.11); *Y02T 10/32* (2013.01); *Y02W 10/37* (2015.05); *Y02W 30/43* (2015.05)

(58) Field of Classification Search
CPC .. C05F 3/02; C05F 11/00; C05F 17/00; C05F 17/0027; C05F 3/28; C05F 2203/006; B01J 20/22; B09B 3/00; C10J 3/72; C10J 2300/0916; C10L 5/363; C10L 5/445; C10L 2290/26; C10L 2290/30; F02B 43/10; Y02W 10/37; Y02W 30/43; Y02P 20/145; Y02E 50/10; Y02E 50/30; Y02T 10/32

See application file for complete search history.

(56) References Cited

U.S. PATENT DOCUMENTS

| | | |
|---|---|---|
| 3,507,788 A | 4/1970 | Cole et al. |
| 4,053,394 A | 10/1977 | Fisk |
| 6,237,284 B1 | 5/2001 | Erickson |
| 6,451,125 B1 | 9/2002 | McClure et al. |
| 6,506,223 B2 | 1/2003 | White |
| 2006/0124541 A1 | 6/2006 | Logan et al. |
| 2008/0197069 A1 | 8/2008 | Binkle et al. |
| 2009/0227003 A1 | 9/2009 | Blotsky et al. |
| 2010/0032370 A1 | 2/2010 | Allen et al. |
| 2011/0079171 A1 | 4/2011 | Capote et al. |

FOREIGN PATENT DOCUMENTS

| | | |
|---|---|---|
| WO | WO1998/040315 A1 | 9/1998 |
| WO | WO2012/009462 A2 | 1/2012 |
| WO | WO2014/143359 A1 | 9/2014 |

*Primary Examiner* — Jennifer A Smith
(74) *Attorney, Agent, or Firm* — Jill A. Jacobson

(57) ABSTRACT

Methods and systems are provided for aerobic digestion of organic waste material.

20 Claims, No Drawings

WASTE PROCESSING METHOD AND APPARATUS

CROSS-REFERENCE TO RELATED APPLICATIONS

This application is a U.S. National Stage filing under 35 U.S.C. § 371 of PCT/US2013/078134, filed Dec. 27, 2013, and claims the benefit of U.S. Provisional Application No. 61/851,928, filed on Mar. 14, 2013, which is incorporated herein by reference in its entirety.

FIELD OF THE INVENTION

This invention relates to reduction and recycling of organic waste material, particularly by aerobic microbial digestion, to produce useful products.

BACKGROUND

Waste reduction and recycling processes have existed for many years. Typically, waste reduction systems include incineration, composting systems (e.g., indoor landfill composting, windrow composting), food waste elimination systems, landfills, gasification systems, algae systems, shredders, and dewatering systems.

Problems with conventional waste reduction systems include waste transportation issues, energy required, such as fuel consumed by heavy equipment for operations, toxic gases produced, long timeframes, leachate problems, toxicological effects on land and water, footprint sizes, and emissions. One problem with some existing waste reduction systems is that the time frames required (e.g., longer than one hour) create additional pollutants. Existing anaerobic processes produce methane and hydrogen sulfide gases, which are much more toxic to the environment than $CO_2$. Further, most conventional waste reduction systems cannot process plastic or rubber. In addition, existing systems typically produce only one product, compost. Production of multiple products, such as biofuel, compost, and energy, would be desirable.

While existing waste reduction devices are suitable for the particular purposes that they address, they are not suitable for the purpose of helping clean up the planet by reducing landfills and landfill pollution and pollutants, which are the main contributors to greenhouse gases and global warming.

BRIEF SUMMARY OF THE INVENTION

Methods and systems are provided herein for processing organic waste.

In one aspect, methods are provided that include: (a) mixing organic waste material with microbial pre-soak liquid in a pre-digester tank, thereby producing a slurry; (b) conducting the slurry to a bioreactor, wherein the bioreactor includes: (i) the organic waste material slurry; (ii) microbes that are capable of digesting the waste material; and (iii) $O_2$; (c) agitating the slurry in the bioreactor at a temperature that is suitable for growth of the microbes and for an amount of time that is suitable for the microbes to digest the waste material to produce digested waste material, wherein $CO_2$ is produced during the microbial digestion process; and (d) conducting the digested waste material to a separator system that separates liquids from solids, wherein solid digested waste material is separated from liquid in the separator system, wherein the solid digested waste material comprises a reduced mass and volume in comparison to the organic waste material that was provided in step (a).

In some embodiments, the microbes that are capable of digesting the organic waste material are added in step (a) and/or step (b). In embodiments in which the microbes are added in both step (a) and step (b), the microbes that are added in step (a) may be the same or different than the microbes that are added in step (b).

In some embodiments, such as embodiments in which microbes are added in step (a), the microbial pre-soak liquid contains oxygen (e.g., for aerobic growth of the microorganisms).

In some embodiments, the digested waste material includes compost, humus, humate, and/or biochar.

In some embodiments, at least a portion of the organic waste material is digested in about 5 minutes to about 1 hour.

In some embodiments, $CO_2$ that is produced during the microbial digestion process is vented from the bioreactor, optionally into an enclosed area for consumption by another organism such as into a greenhouse with plants or an algae tank, and/or optionally compressed for other uses.

In some embodiments, the organic waste material is processed continuously. In other embodiments, the organic waste material is processed intermittently.

In some embodiments, the organic waste material includes wood, hydrocarbons, paper, fecal matter, landscape waste, meat, carbohydrates, proteins, and/or food waste. In some embodiments, the organic waste material includes plastic and/or rubber.

In some embodiments, the organic waste material is deconstructed and/or comminuted prior to mixing in the pre-digester. For example, deconstruction and/or comminution may include grinding and/or shredding. In some embodiments, deconstruction and/or comminution provides at least a portion of the organic waste reduced to particles that are less than about 2 inches, less than about 1 inch, and/or less than about 0.5 inch in diameter.

In some embodiments, the organic waste material and microbial pre-soak liquid are heated to a temperature of 115°-160° F. in the pre-digester.

In some embodiments, agitation of the organic waste material in the pre-digester includes a pump with cutters. In some embodiments, the organic waste material is agitated in the pre-digester for at least about 5 minutes up to about 1 hour or longer. In some embodiments, the organic waste material is agitated in the pre-digester for a length of time sufficient to carbonize at least a portion of the waste material.

In some embodiments, the microbes in the pre-digester and/or bioreactor include mesophilic, thermophilic, and/or hyperthermophilic bacteria.

In some embodiments, the $O_2$ in the bioreactor is from air and/or compressed $O_2$.

In some embodiments, the temperature in the bioreactor is 115°-160° F. The temperature in the bioreactor may be the same or different than the temperature in the pre-digester.

In some embodiments, the digestion of the waste material in the bioreactor is conducted with mixing of the slurry and the microbes.

In some embodiments, the bioreactor includes an abrasion screen. For example, the abrasion screen may be on at least a portion of the walls and/or floor of the bioreactor tank. For example, the abrasion screen may be composed of perforated metal.

In some embodiments, the system includes a pH monitor for monitoring pH in the pre-digester, the bioreactor, or both.

In some embodiments, the pH in the pre-digester and/or bioreactor is regulated in the range of about 3.0 to about 8.5.

In some embodiments, a nitrogen-containing byproduct (e.g., $N_2$ and/or ammonia) is produced in and exhausted from the bioreactor.

In some embodiments, the digested waste material is conducted to the separator system with an auger or other conveyer system.

In some embodiments, the system includes a filter for recovery of microbes. For example, the filter may include a high surface area support media, such as ceramic, plastic, sand, coral, and/or rock. In some embodiments, microbes are recovered from the liquid output from the solid-liquid separator system on the filter.

In some embodiments, liquids are separated from solids in the separator system with a dewatering press, a belt press, or a container with perforations through which liquid may exit. In some embodiments, the solid material that exits the separator system is converted to pellets.

In some embodiments, the solid material that exits the separator system is burned to produce electricity. In some embodiments, the solid material that exits the separator system is gasified to produce syngas. In some embodiments, the solid material that exits the separator system is converted to biofuel, syngas, landfill topping, sorbent, fertilizer, and/or fire logs.

In some embodiments, the liquid exiting the separator system is filtered to produce water suitable for drinking or other uses. In some embodiments, the liquid exiting the separator system is recirculated back to the pre-digester (optionally with heating prior to introduction into the pre-digester).

In some embodiments, one or more metals (e.g., gold) is recovered in the separator system.

In some embodiments, microbes that are recovered in the separator system are recirculated back to the bioreactor and/or stored in a separate microbial reservoir.

In another aspect, systems are provided that include: (a) a pre-digester tank, including: (i) an inlet transferring organic waste material into the pre-digester tank; (ii) heated liquid; and (iii) a mixer for mixing the organic waste material with the heated liquid to produce a slurry; (b) a bioreactor downstream from and in fluid communication with the pre-digester tank, including: (i) an inlet for transferring the slurry produced in the pre-digester tank into the bioreactor; (ii) microbes that are capable of digesting the organic material under aerobic conditions; (iii) oxygen; (iv) heat; and (v) a mixer for mixing the slurry with the microbes; and (c) a solid-liquid separator downstream from and in fluid communication with the bioreactor, wherein digested waste output from the bioreactor is separated in the solid-liquid separator into a material that is substantially solid and a material that is substantially liquid.

In some embodiments, the system further includes one or more apparatus for deconstructing and/or comminuting the organic waste material prior to introduction into the pre-digester tank. For example, deconstruction and/or comminution may include grinding and/or shredding of the organic waste material. In some embodiments, at least a portion of the organic waste material is reduced in size to particles with diameters of less than about 2 inches, less than about 1 inch, and/or less than about 0.5 inch.

In some embodiments, the pre-digester tank further includes: (iv) microbes that are capable of digesting the organic waste material under aerobic conditions; and (v) oxygen. The microbes in the pre-digester may be the same as or different than the microbes in the bioreactor.

In some embodiments, the mixer in the pre-digester comprises a pump with cutters. In an embodiment, the system includes a mechanism for recirculating the organic waste material and liquid through the pump.

In some embodiments, the bioreactor further includes: vi) an outlet for venting gases that are produced during the digestion process out of the bioreactor. For example, $CO_2$, and optionally nitrogen-containing gas, that is produced in the microbial digestion process may exit the system through the gas outlet.

In some embodiments, at least a portion of the inner surface of the bioreactor includes an abrasion screen, for example, composed of perforated metal.

In some embodiments, the system further includes an auger or other conveyer system for transfer of the digested waste output from the bioreactor to the solid-liquid separator. In some embodiments, the solid-liquid separator includes a dewatering press, a belt press, or a container with perforations through which liquid may exit.

In some embodiments, the system further includes an apparatus for producing pellets from the solid output from the solid-liquid separator.

In some embodiments, the system further includes a biofilter which is upstream from and in fluid communication with the bioreactor, wherein microbes are stored on a high surface area support media in a dormant form when the system is not in operation and may be introduced to the bioreactor during operation of the system. In some embodiments, the biofilter is further upstream from and in fluid communication with the pre-digester tank, configured for introduction of microbes to the pre-digester tank when the system is in operation. In some embodiments, the high surface area support media includes ceramic, plastic, sand, coral, and/or rock. In some embodiments, the biofilter is downstream from and in fluid communication with the solid-liquid separator, wherein liquid output from the solid-liquid separator flows through the biofilter, thereby depositing microbes on the support media.

In some embodiments, the system further includes a conduit for conducting liquid output from the solid-liquid separator to the pre-digester and/or bioreactor, for use as liquid in the pre-digestion process and/or in the digestion process in the bioreactor.

In some embodiments, the system further includes one or more pH monitors for determining pH in the pre-digestion tank, the bioreactor, and/or in the biofilter. For example, pH may be regulated at about 3.0 to about 8.5 in the pre-digestion tank, the bioreactor, and/or the biofilter.

In some embodiments, the system is configured for aerobic digestion of at least a portion of the organic waste material to $CO_2$ and other byproducts in about 5 minutes to about 1 hour.

In another aspect, solid and/or liquid outputs from methods and systems described herein are provided. In one embodiment, a solid digested organic material, produced according to any of the methods described herein, is provided. For example, the solid digested organic material may include compost, humus, humate, and/or biochar. In another embodiment, a liquid output from the methods and systems described herein, is provided. In some embodiments, a fertilizer is provided that includes solid and/or liquid output from a method or system described herein.

DETAILED DESCRIPTION

Methods, systems, and apparatus are provided for waste (e.g., municipal solid waste ("MSW") reduction, recycling, and conversion to multiple commodities. The methods and systems disclosed herein include aerobic digestion of organic (i.e., carbon-containing) waste material with a microbial (e.g., bacterial and/or fungal) system that produces $CO_2$, and optionally nitrogen-containing byproduct(s), such as $N_2$ and/or ammonia, from the organic waste, along with other commodity products, such as, for example, compost, humus, humate, humic acid, biofuel, water, landfill topping, sorbents, solid and/or liquid fertilizer, fire logs, and/or metals (e.g., gold). The methods and systems disclosed herein provide for processing of organic waste material to produce digested waste material, $CO_2$, and optionally other byproducts. In some embodiments, organic waste (e.g., at least a portion, substantially all, or all of the organic waste material that is processed in a system or method as described herein) may be digested to a solid compost or humate type of material in less than 1 hour. In some embodiments, the mass and/or volume of waste may be reduced by at least about 50%, 55%, 60%, 65%, 70%, 75%, 80%, or 85% using the methods and systems disclosed herein, e.g., including aerobic microbial digestion in less than 1 hour. In some embodiments, the mass and/or volume of waste may be reduced by about 50% to about 60%, about 60% to about 70%, about 70% to about 80%, or about 80% to about 85%. In embodiments of the methods and systems described herein, no or substantially no methane gas is produced. In embodiments of the methods and systems described herein, no or substantially no hydrogen sulfide gas is produced.

Organic Waste Material

A variety of organic materials (e.g., material that contains one or more carbon atoms and is capable of decay) may be processed using the methods and systems disclosed herein. For example, MSW, plastic, and/or rubber may be processed using the methods and systems herein, reducing the amount of material that goes into landfills. Nonlimiting examples of organic materials that may be processed using the methods and systems disclosed herein include wood, hydrocarbons, paper, fecal matter, landscape waste, meat, bones, fish, carbohydrates, proteins, food waste, yard waste, manure, cardboard, biodegradable plastic (e.g., biodegradable cutlery, utensils, containers, etc.), and/or decomposing garbage which may cause pollution. Organic materials that may be processing according to the methods and systems herein are biodigestible under aerobic conditions (e.g., capable of microbial digestion to $CO_2$ and other byproducts in the presence of oxygen).

In some embodiments, waste may be pre-sorted before digestion in the methods and systems disclosed herein to remove materials that will not digest or that may digest more slowly than others. For example, materials that include but are not limited to plastics, Styrofoam, metals, batteries, solvents, and/or petroleum-based products may be removed from the waste material entering the waste reduction system.

Deconstruction/Comminution

In some embodiments of the methods and systems disclosed herein, organic waste material is deconstructed and/or comminuted prior to pre-digestion, e.g., to break down the waste material into smaller component parts and/or to reduce the average particle size of the waste material. Deconstruction and/or comminution may include mechanical degradation processes to reduce the size of components of the waste material. For example, deconstruction and/or comminution may include grinding and/or shredding, or the like. In some embodiments, deconstruction and/or comminution includes a wet or dry shredder. In some embodiments, deconstruction and/or comminution includes a pump with shredding and/or grinding capabilities. Deconstruction and/or comminution may reduce the size of the waste material to particles with diameters of less than about 2 inches, less than about 1 inch, or less than about 0.5 inch average diameter. The smaller size particles may increase the surface area available for growth of microbial cultures and improve microbial digestion of the waste material in the downstream digestion process.

Pre-Digestion

In the methods and systems disclosed herein, organic waste material (e.g., MSW) is mixed with a microbial pre-soak liquid in a pre-digester tank to produce a slurry. The microbial pre-soak liquid and waste material are heated to a temperature that is suitable for partial physical and/or chemical breakdown of the material and/or microbial action. The microbial pre-soak liquid may contain water (e.g., purified water and/or municipal water that may contain other contaminants or trace elements), and optionally may contain microbial growth nutrients.

The pre-soak liquid may be heated prior to, concurrent with, or after addition of organic waste material. In some embodiments, the pre-soak liquid is pre-heated prior to addition of unheated waste material to the pre-digester tank. In other embodiments, the pre-soak liquid and the waste material are each separately heated prior to mixing in the pre-digester tank. In other embodiments, unheated pre-soak liquid and unheated waste material are mixed and heated in the pre-digester tank.

In some embodiments, the pre-digester tank is filled with pre-soak liquid that has been pre-heated to a temperature of about 115° F. to about 160° F. In some embodiments, the pre-soak liquid is pre-heated to a temperature of about 115° to about 120°, about 120° to about 125°, about 125° to about 130°, about 130° to about 135°, about 135° to about 140°, about 145° to about 150°, about 150° to about 155°, or about 155° to about 160° F. In some embodiments, the pre-soak liquid is pre-heated to a temperature of about 115° to about 135°, about 120° to about 140°, about 125° to about 145°, about 130° to about 155°, about 115 to about 145, about 120° to about 150°, about 125° to about 155°, about 130° to about 160°, or about 120° to about 160° F.

In some embodiments, the temperature of the pre-soak liquid and organic material mixed in the pre-digester tank is about 115° F. to about 160° F. In some embodiments, the temperature of the pre-soak liquid and organic material in the pre-digester tank is about 115° to about 120°, about 120° to about 125°, about 125° to about 130°, about 130° to about 135°, about 135° to about 140°, about 145° to about 150°, about 150° to about 155°, or about 155° to about 160° F. In some embodiments, the temperature of the pre-soak liquid and organic material in the pre-digester tank is about 115° to about 135°, about 120° to about 140°, about 125° to about 145°, about 130° to about 155°, about 115 to about 145, about 120° to about 150°, about 125° to about 155°, about 130° to about 160°, or about 120° to about 160° F.

In some embodiments, the liquid that is introduced into the pre-digester is aerated, for example, with an air blower or other method for introducing $O_2$. In some embodiments, the microbial pre-soak liquid may be aerated prior to, in conjunction with, and/or after introduction into the pre-digester. In some embodiments, the mixed pre-soak liquid and organic waste may be aerated prior to, during, and/or after mixing. Oxygen may be introduced, for example, with a venturi system, air stone, air piping grid, air compressor, compressed oxygen, or any system which produces $O_2$. In some embodiments, oxygen is present in the microbial pre-soak liquid at a concentration up to about 50 ppm, for example, about 19 ppm to about 50 ppm.

In some embodiments, the amount of microbial pre-soak liquid that is added is an amount that is suitable for producing a slurry that is capable of flowing through a conduit into the downstream bioreactor, such as, for example, through a pump such as a chopper pump.

The organic waste material and microbial pre-soak liquid are mixed in the pre-digester for a period of time suitable to produce a slurry. For example, the material may be agitated in the pre-digester for about 5 minutes to about 1 hour or longer. In some embodiments, the material in the pre-digester is agitated using a pump with cutters, e.g., a recirculating chopper pump. In some embodiments, the waste material is agitated in the pre-digester for a period of time suitable to carbonize at least a portion of the organic material. In some embodiments, heat and mechanical friction serve to carbonize at least a portion of the organic material.

The pre-digester tank may be of any size that is suitable for the amount and type of waste to be processed. Materials that may be used for construction of the pre-digester tank include, but are not limited to, plastic, composite, concrete, and/or stainless steel. In some embodiments, the pre-digester tank contains single or double wall construction. In a double-walled pre-digester tank, the walls may constructed of the same or different materials. In some embodiments, the pre-digester tank is heated with a heater jacket. In some embodiments, the bottom of the tank contains a conical or flat-bottomed configuration.

In some embodiments, microbes that are capable of digesting the organic waste under aerobic conditions, and producing $CO_2$ as a byproduct of the digestion, may be added to the pre-digester, and mixed with the organic waste material as the slurry is produced, or after production of a slurry but prior to conducting the slurry to the downstream bioreactor. In some embodiments, the microbes may be added to the microbial pre-soak liquid prior to mixing with the organic waste material.

In some embodiments, the microbes are mesophiles, thermophiles, and/or hyperthermophiles, e.g., mesophilic, thermophilic, and/or hyperthermophilic bacterial and/or fungal species. In some embodiments, the microbes include mesophilic bacterial and/or fungal species, thermophilic bacterial and/or fungal species, and hyperthermophilic bacterial and/or fungal species. The microbes are capable of digesting organic waste material in the presence of oxygen, producing $CO_2$, and optionally nitrogen-containing gas(es), as byproduct(s) of the digestion. Examples of mesophilic, thermophilic, and hyperthermophilic microbes that may be used in the methods and systems described herein include, but are not limited to, microorganisms from the genera *Pseudomonas* (e.g., *P. putida*, *P. fluorescens*), *Comamonas*, *Bacillus* (e.g., *B. stearothermophilus*, *B. caldolyticus*, *B. caldovelox*, *B. caldotenax*, *B. subtilis*), *Burkholderia*, *Xanthomonas*, *Rhodococcus*, *Thermomonospora*, *Aeropyrum*, *Trichoderma*, *Aspergillus*, and/or *Phanerochaete*.

Bioreactor

The mixture of organic waste material and microbial pre-soak liquid, and optionally microbes, in the pre-digester tank is conducted to a bioreactor for microbial digestion of the organic material. The bioreactor contains microbes, oxygen, and the pre-digested organic material. The microbes reduce the mass and volume of the material by digestion. Aerobic microbial action on the organic material produces digested organic material (e.g., compost, humus, humate, humic acid, biochar), $CO_2$, water, heat, and optionally other waste gases such as nitrogen (e.g., $N_2$ and/or ammonia). In preferred embodiments, the organic material (e.g., at least a portion, substantially all, or all of the organic material that is introduced into a waste processing system as described herein) is digested in the bioreactor for about 5 minutes to about 1 hour, producing a product that is greatly reduced in mass and volume.

The mixed organic waste material and microbial pre-soak liquid in the pre-digester tank is conducted through a conduit to the bioreactor. For example, the material may be conducted to the bioreactor through a pump, for example, a chopper pump.

The bioreactor may be of any size that is suitable for the amount and type of waste to be processed. Materials that may be used for construction of the bioreactor include, but are not limited to, stainless steel, fiberglass, concrete, and/or composites. Oxygen may be pumped into the bioreactor tank (e.g., pumped into the bottom of the tank), optionally through a diffuser, such as screening. Diffusion of oxygen as it enters the bioreactor may increase microbial growth rate. Oxygen may be fed into the bioreactor, for example, via compressed air tanks, an air compressor, or an air blower.

In some embodiments, the bioreactor is heated to a temperature of about 115° F. to about 160° F. In some embodiments, the bioreactor is heated to a temperature of about 115° to about 120°, about 120° to about 125°, about 125° to about 130°, about 130° to about 135°, about 135° to about 140°, about 145° to about 150°, about 150° to about 155°, or about 155° to about 160° F. In some embodiments, the bioreactor is heated to a temperature of about 115° to about 135°, about 120° to about 140°, about 125° to about 145°, about 130° to about 155°, about 115° to about 145°, about 120° to about 150°, about 125° to about 155°, about 130° to about 160°, or about 120° to about 160° F. The temperature in the bioreactor may be the same or different than the temperature in the pre-digester tank.

In some embodiments, oxygen is present in the bioreactor at a concentration up to about 50 ppm, for example, about 19 ppm to about 50 ppm.

In some embodiments, the microbes in the bioreactor are mesophiles, thermophiles, and/or hyperthermophiles, e.g., mesophilic, thermophilic, and/or hyperthermophilic bacterial and/or fungal species. In some embodiments, the microbes include mesophilic bacterial and/or fungal species, thermophilic bacterial and/or fungal species, and hyperthermophilic bacterial and/or fungal species. The microbes are capable of digesting organic waste material in the presence of oxygen, producing $CO_2$ and optionally a nitrogen-containing gas(es) as byproduct(s) of the digestion. Examples of mesophilic, thermophilic, and hyperthermophilic microbes that may be used in the methods and systems described herein include, but are not limited to, microorganisms from the genera *Pseudomonas* (e.g., *P. putida*, *P. fluorescens*), *Comamonas*, *Bacillus* (e.g., *B. stearothermophilus*, *B. caldolyticus*, *B. caldovelox*, *B. caldotenax*, *B. subtilis*), *Burkholderia*, *Xanthomonas*, *Rhodococcus*, *Thermomonospora*, *Aeropyrum*, *Trichoderma*, *Aspergillus*, and/or *Phanerochaete*. In embodiments in which microbes are included in the pre-digestion process, the microbes in the pre-digester and the bioreactor may be the same or different.

Material in the bioreactor is mixed, continuously or intermittently. Mixing may improve access of the microbes to the organic material, improving the rate of digestion. In some embodiments, the bioreactor contains a mixer that mixes the material. For example, the material in the bioreactor may be mixed at about 20 to about 30 RPM.

In some embodiments, the bioreactor contains or is in communication with a pH monitoring system. pH may be monitored and adjusted to a level that is suitable for growth of the microbes that are contained in the bioreactor for digestion of the organic waste. In some embodiments, the pH is regulated at about pH 3.0 to about pH 8.5.

Waste gases, such as $CO_2$, and optionally nitrogen-containing gas(es), may be vented out of the bioreactor, collected, digested, or enclosed in a greenhouse or algae tank to prevent $CO_2$ from entering the atmosphere.

$CO_2$ and nitrogen-containing gas(es) that are vented into a greenhouse may be metabolized by the plants and reduce or eliminate $CO_2$ entering the atmosphere. $CO_2$ and nitrogen-containing gas(es) may alternately be collected and reserved for other uses. In other embodiments, $CO_2$ may be utilized by an algae system to accelerate growth of the algae, for example, for production of useful products such as biofuels, food, oils, and/or vitamins. In some embodiments, the algae may be used for production of oil. The oil may be separated from the algae and then the spent algae digested in a waste reduction system as described herein.

In some embodiments, $CO_2$ that is produced in the bioreactor is recovered and compressed.

In some embodiments, the bioreactor contains an abrasive material, e.g., an abrasion screen. The abrasive may provide a grinding action on the organic material, ensuring contact between the microbes and fresh, undigested organic material. For example, an abrasion screen may be constructed of a perforated material, such as perforated metal. In some embodiments, the abrasion material, e.g., abrasion screen, may be located on at least a portion of the walls and/or bottom of the bioreactor. Screening may contain openings of various sizes, for example, up to about 1 inch in diameter. In some embodiments, screening may also be used to drop digested waste of a certain size into an auger driver sluice for solid/liquid separation.

In some embodiments, additional inoculant of microbial culture may be added during pre-digestion and/or during digestion in the bioreactor, which may accelerate the digestion process.

In some embodiments, the species and/or combination of species of microbes that are used for digestion and that are added during pre-digestion and/or during digestion in the bioreactor may be adjusted for optimal digestion of a particular type of waste material.

In some embodiments, the waste digestion process operates more efficiently over time (e.g., less time required for waste digestion). In some embodiments, as the microbe(s) reproduce and create more colonies that are suitable for digestion of a particular type of waste that is being digested, the waste digestion process will operate at a faster rate.

In some embodiments, the amount of water used in the system may be adjusted (e.g., increased) to produce more liquid output, which may be used as a liquid fertilizer.

Liquid/Solid Separator

Digested organic material is conducted to a separator system (e.g., a dewatering system) for separation of liquids from the solid digested material. In some embodiments, an auger or other conveyer system is used to transport the material out of the reactor. In some embodiments, an auger transports the material at a speed of about 10 to about 25 RPM. The auger may be constructed, for example, of stainless steel, nylon, or other suitable material, in the form of a cork screw configuration.

In some embodiments, liquids and solids are separated with a dewatering press, a belt press, or a container with perforations through which liquid may exit.

In one embodiment, the liquids and solids are separated from the digested organic material through screening which is on a reservoir with an auger. The auger may be mounted inside a tube, with brushes that can carry the solid product out of the tube while the screening drops the water and some sediments which fit through the screening.

In some embodiments, the liquid portion of the digested organic material is collected in a reservoir. In some embodiments, the liquid contains water and humic acid. It may contain a screen to keep the pumps clean of debris. In some embodiments, heavy metals such as gold may be collected in the reservoir. The liquid reservoir may be constructed of any material that is suitable for containing the liquid, including but not limited to, plastic, concrete, composites, and/or stainless steel.

The liquid output may be recirculated to the pre-digester and/or the bioreactor, may be circulated to a biofilter for recovery of microbes, and/or may be "polished" for purification of water, for example, as drinking water or for other uses.

In some embodiments, a microbial inoculant (e.g., bacterial and/or fungal inoculant) may be added to the liquid in the reservoir. For example, one or more microbial (e.g., bacterial and/or fungal) strain that grows at the temperature of the liquid in the reservoir (e.g., lower temperature than pre-digester and/or bioreactor) and is capable of digesting organic waste as described herein may be added to the liquid and then transported with at least a portion of the liquid to the pre-digester and/or bioreactor, where it may contribute to the digestion of the organic material.

In some embodiments, the liquid may be "polished" (e.g., purified) by filtration, for example, through at least one micro, nano, or reverse osmosis filtration.

In some embodiments, the solid material is conducted to an apparatus that converts it to pellets (e.g., a pelletizer machine). For example, the pelletizer system may contain a form mold that creates pellets by applying pressure to the solid material. Pellets may be created in various sizes for use as humus, biofuel, fire logs, sorbents, or other commodities.

The solid output may optionally be sterilized at high temperature. In some embodiments, the solid material is heated to a temperature of at least about 155° F. for at least about 40 minutes, either during or after separation of solids from liquids, which may provide further breakdown of the solid material and/or sterilization. In some embodiments, a heater or heating element is wrapped around the solid output outlet for sterilization of the solid material as it exits the system.

Biofilter

A "biofilter" is a container that contains a media with a high surface area. In this container microbial (e.g., bacterial and/or fungal) cultures are grown, and optionally preserved when they go dormant with microbial growth restarted by addition of $O_2$, $H_2O$, food (e.g., organic waste material), and heat to a temperature that is suitable for microbial growth and organic waste digestion. In some embodiments, the pH of the media may be adjusted to a desired pH level that is suitable for growth of the microbes supported thereon.

In some embodiments, microbes (e.g., bacteria and/or fungi) are recovered from the output from the bioreactor (e.g., liquid output that is recovered from the separator system), by filtering the liquid output through the biofilter, wherein microbes in the liquid are retained on the high surface area media. The microbes may be grown on the media at a temperature that is suitable for their growth, and recirculated to the pre-digester and/or bioreactor, and then go dormant when the temperature is lowered.

In some embodiments, the biofilter is in the form of a "tower" that grows microbes (e.g., bacteria and/or fungi), circulating them to the pre-digester and/or bioreactor when the system is in operation, and then preserving microbes in a dormant form when the system is not in operation. Microbes may be conducted from the biofilter to the pre-digester and/or bioreactor by flowing liquid (e.g., water or liquid output from the separator system) over the support media.

In some embodiments, the high surface area support media is composed of ceramic, plastic spheres, sand, coral, and/or rock, although other suitable materials are known in the art and may be deployed for this purpose.

Products

The nature of the solid digested organic material is dependent on the starting waste material that is used. In some embodiments in which organic waste such as MSW is used as the starting material, a fibrous digested biomass product is produced. In embodiments in which plastic or rubber is used as a starting material, a particulate product is produced that is reduced in mass and partially broken down (e.g., some of the carbon removed) versus the starting material, and which may be degraded faster through natural processes, for example, in a landfill, than the starting material.

In some embodiments, products of organic waste such as MSW (i.e., the solid output from an organic waste reduction process as described herein) may be burned to provide power, such as electricity, and/or gasified to produce syngas. The syngas may itself be used as a fuel. The power derived from gasification of the solid product and combustion of the resultant gas may serve as a source of renewable energy. In other embodiments, the products may be used for other purposes, such as fertilizer, soil amendment, sorbents, fire logs, or the like. In one embodiment, the solid and/or liquid product may be used as a fertilizer product, helping to accelerate the growth of plants.

In some embodiments, gas products, such as $CO_2$, may be recovered and compressed.

Systems

Systems for digesting organic waste are provided. A system as disclosed herein may be in the form of a machine into which organic waste material is introduced and from which solid digested material and liquid output exit the machine.

In some embodiments, the system includes a pre-digester upstream from and in fluid communication with a bioreactor, which is upstream from and in fluid communication with a solid-liquid separator system. The pre-digester may contain a mixer for mixing organic waste material and microbial pre-soak liquid, with heat, to produce a slurry. The pre-digester may optionally contain microbes that are capable of digesting the organic material, and oxygen. The bioreactor may contain a mixer for mixing the slurry that is produced in the pre-digester with microbes that are capable of digesting the organic material (e.g., within about 5 minutes to about 1 hour) and oxygen, with heat, to produce digested organic waste material, wherein $CO_2$, and optionally nitrogen-containing gas(es), are produced during the digestion process. The solid-liquid separator separates the solid digested organic material from liquid. The solid digested material that is produced in the system is reduced in mass and volume in comparison to the organic waste starting material prior to the microbial digestion.

In some embodiments, the system includes an auger or other conveyer system for transporting the digested organic waste from the bioreactor to the separator system. In some embodiments, the separator system includes a dewatering press, a belt press, or a container with perforations through which liquid may exit.

The system may include an outlet through which liquid output exits the system and an outlet through which solid output exits the system. In some embodiments, the liquid output may be predominantly liquid but may some solid material and the solid output may be predominantly solid but may include some liquid. The liquid output may be filtered to remove residual material and the solid output may be dried to remove residual liquid.

In some embodiments, the bioreactor contains vent(s) for removal of gas byproducts from the system, such as $CO_2$ and nitrogen-containing gas (e.g, $N_2$ and/or ammonia).

In some embodiments, the pre-digester contain a pump with cutters for mixing the organic waste material and microbial pre-soak liquid.

In some embodiments, at least a portion of the inner surface of the bioreactor contains an abrasion screen. For example, the abrasion screen may be constructed of a perforated material such as perforated metal.

In some embodiments, the system includes one or more device(s) for deconstruction and/or comminution of the organic waste material upstream from the pre-digester, for example, device(s) with shredding and/or grinding capabilities.

In some embodiments, the system contains a pH monitoring system, for monitoring the pH of the pre-digester and/or bioreactor. In some embodiments, pH is regulated to about pH 3.0 to about pH 8.5, depending on the growth requirements of the microorganisms.

In some embodiments, the system includes a biofilter that contains high surface area media which collects microbes from the liquid output from the system and provides microbes to the pre-digester and/or bioreactor. The high surface area media may be, for example, ceramic, plastic, sand, coral, and/or rock. In some embodiments, the biofilter is in the form of a "tower" that grows microbes (e.g., bacteria), circulating them to the pre-digester and/or bioreactor when the system is in operation, and then preserving microbes in a dormant form when the system is not in operation.

In some embodiments, the system further includes an enclosed area into which $CO_2$ gas is exhausted from the system and consumed by another organism, for example a greenhouse with plants or an algae tank.

In some embodiments, the system further includes a pelleting apparatus for converting solid output to pellets.

The systems disclosed herein may be configured for intermittent or continuous operation. In various embodiments, the systems described herein may be operated in continuous, batch, or semi-batch mode.

Energy

In some embodiments, a system for processing organic waste material, as described herein, is powered by solar energy.

In some embodiments, the system is powered by electricity that is produced from the burning of solid digested waste output from the system.

In some embodiments, the system is powered by syngas that is produced from gasification of solid digested waste output from the system.

Exemplary Embodiments

Embodiments of the methods and systems described herein are presented below. These exemplary embodiments are presented herein for purposes of illustration, and are not intended to limit the invention.

A MSW reduction, recycling & multi-commodity machine is provided, which comprises shredders, grinders, a hot water pretreatment reservoir, reactor, dewatering system, pellet press, gasification, algae system, $CO_2$ Containment System, and Solar Electricity. The grinder is used to grind and shred the MSW. The grinded MSW is converted to water pollution. The MSW water pollution mixed with water is sent to the Reactor for processing. Perforated metal in assorted sizes is provided. An auger that will move the sludge product is provided. The dewatering system will separate the solids form the liquids. The solid is sent to a pelletizer machine. The water reservoir collects the water. A Microbe Biofilter with a high surface area is provided. The following are also provided: A piping system is provided to recirculate the microbes to the reactor or pre-digester tank. A device that makes syngas to power internal combustion engines. A device that grows algae that will digest the $CO_2$ and nitrogen and grow algae. A device to capture $CO_2$. A device to generate solar energy and create power. A device to make power from fuels.

The grinder is used to grind and shred the MSW. The grinder shredder will grind and shred the municipal solid waste to below 1 inch in diameter. Making the MSW as small as possible will help the microbes digest the waste plus increase the surface area for cultures to grow at a faster rate. The MSW is now inserted into the Pre-digester tank. The grinder or shredder can be various devices used to shred and grind municipal solid waste. The shredder can be a wet or a dry shredder. The shredder or grinder can be a pump.

The grinded MSW is converted to water pollution. The Pre Digester Tank is filled with heated water that can be in the range of 115 to 135 degrees F. It is aerated with an air blower. The amount of water added is a $H_2O$/MSW mix to create a controlled water pollution environment that can flow through a recirculating chopper pump. The mesophiles, thermophiles and hyper thermophiles microbes are added. Once all materials are blended in the tank the MSW water pollution is sent to the digester by way of a chopper pump. The pre digester tank is any size made of plastic, composite, concrete or stainless steel. It can have a single or double wall construction so the tank can be heated to 120 to 150 degrees F. It can be heated with a heater jacket. The bottom of the tank can be a cone or a flat bottom. The air blower can be a venturi system, air stone, air piping grid, air compressor, compressed oxygen or $O_2$ system.

The MSW water pollution is sent to the Reactor for processing. The Reactor is a vessel of any size that has oxygen pumped into the bottom of the tank to feed the microbes. The oxygen is diffused by the screening so all microbes reproduce and double at a fast rate. The reactor is heated between 120 to 155 degrees F. to insure the microbes' reproduction. The reactor has a mixer which turns at 20 to 30 RPM to ensure the microbes get plenty of food making uneaten surface available for the consumption of the microbes. The microbes colonize on the surface area of the MSW. They reduce the size of the MSW by digestion. The waste such as $CO_2$ and Nitrogen are vented out, collected, digested or enclosed in a greenhouse so no $CO_2$ will enter our atmosphere. EPA and USCC conclude aerobic composting does not contribute to $CO_2$, emissions, the main contributors to greenhouse gas response and global warming. The Reactor can be made of stainless steel, fiberglass, concrete or composites. Oxygen can be fed by an $O_2$ system, compressed air tanks, air compressor or an air blower. Venting of the $CO_2$ and Nitrogen in a greenhouse will help feed the plants plus no $CO_2$ will enter our atmosphere. We can also send the $CO_2$ and Nitrogen for collection. The $CO_2$ can also be sent to an algae system for accelerated growth of algae for use in creating bio fuels, food or vitamins.

Perforated metal in assorted sizes is provided in the bioreactor. The screening is used as an abrasive around the tank to ensure the microbes always have fresh MSW waste to eat and to drop the digested waste of a certain size into the auger driver sluice. The screening can be of various sizes to 1 inch in diameter.

An auger that will move the sludge product is provided. The driver is an auger that transports the digested MSW and water out of the reactor at 10 to 25 RPM. The auger is a stainless steel or nylon cork screw.

A dewatering system will separate the solids form the liquids is provided. The dewatering machine takes the MSW digested slurry which is now humic acid and humus and separates it through a screening which is on a reservoir with an auger. The auger is mounted inside a tube and has brushes which can carry the solid product out the tube while the screening drops the water and some sediments which fit through the screening. Dewatering can be a sludge dewatering press, a belt sludge press, or just a container with perforations to drop the water.

The solid is sent to a pelletizer machine. The pelletizing machine can be added after the dewatering system creating humus pellets, bio fuel, fire logs, sorbents, or other commodities. It comprises a form mold under pressure that will take the solid product and put pressure on it the by creating pellets of assorted sizes. The water reservoir collects the water. The water reservoir is a container that collects the water and humic acid that comes out of the dewatering system. It contains a screen to keep the pumps clean of debris. Heavy metals such as gold will collect in this container. In this container inoculants (bacteria) will be added since it operates at a lower temperature for other strains of bacteria which will run some of the water back through the system. The water reservoir can be made of plastic, concrete, composites or stainless steel.

A Biofilter with a high surface area is provided. The biofilter is a container which has a media with a high surface area. In this container bacteria cultures are grown, preserved when they go dormant so that it will help the system achieve the full potential of massive colonies of microbes. The biofilter is made of plastic, composite, stainless steel and is a vessel that holds media such as bio-balls, ceramic or other media with a high surface area to house colonies of microbes.

A piping system to recirculate the microbes to the reactor or pre-digester tank is provided. The closed loop recirculation process circulates the water that passes over the biofilter media thereby injecting the system with more microbes. It creates a ecosystem of nitrifying bacteria. This system can be sent to the reactor or pre-digester tank. Anywhere the operator wants such as faster digestion in the pre-digester tank or accelerated digestion in the reactor. The closed loop system is made of stainless steel, composite or plastic piping.

A device that makes syngas to power internal combustion engines may be provided. Gasification or Plasma Gasification Process (PGP) is a waste treatment technology that uses electrical energy and the high temperatures created by an electric arc gasification system. This arc breaks down waste primarily into elemental gas and solid waste (slag), in a device called a plasma converter. The process has been intended to be a net generator of electricity, depending upon the composition of input wastes, and to reduce the volumes of waste being sent to landfill sites. A machine to generate syngas to power engines or generators with or without plastics or rubber in the MSW waste stream may be provided.

A device that grows algae that will digest the $CO_2$ and nitrogen and grow algae can put an end to this damaging process, by capturing the effluent waste streams and harvesting the algae grown on them. A system to digest $CO_2$ and convert it to oxygen may be provided. The algae can be recaptured for product.

A device to capture $CO_2$ may be provided. Carbon capture and storage (CCS), (carbon capture and sequestration), refers to technology attempting to prevent release of large quantities of $CO_2$ into the atmosphere from fossil fuel use in power generation and MSW digestion, for example, using pressure vessels, green houses, algae system or digestion.

A device to generate solar energy and create power may be provided. Solar power is the conversion of sunlight into electricity, either directly using photovoltaic (PV), or indirectly using concentrated solar power (CSP). Photovoltaic may be used to power the system.

A device to make power from fuels may be provided. An engine-generator is the combination of an electrical generator and an engine (prime mover) mounted together to form a single piece of equipment. This combination is also called an engine-generator set or a gen-set. In many contexts, the engine is taken for granted and the combined unit is simply called a generator. Coal, diesel, gas, or bio gas may be used as a fuel.

The incoming MSW is shredded through the shredder grinder then delivered to the reactor. The reactor digests the organic waste. The screen filters the particulates and the auger dives out the digested output. During these processes oxygen, hot water and bacteria are made available throughout the process. Once the product gate is opened the slurry is sent to a dewatering system. The solid waste is sent to a friction compressor for fuser dewatering and the liquid output is sent back on a closed loop system to the bio filter for more microbes to digest more MSW. Some of the liquid can be diverted for product. The solid waste can be sent for use for bio fuels, humus, compost, or other products needed to enhance our environment. The $CO_2$ can be captured or sent for digestion or just sent to the atmosphere. The $CO_2$ can be let go to feed plants $CO_2$ in a greenhouse.

The machine can be made in concrete, composites, stainless steel. The tanks can be in different configurations.

The dewatering systems can be made differently to accommodate different applications and outputs.

The machine was made to reduce, reuse and recycle solid organic municipal solid waste in a matter of minutes, and less than 1 hour. The speed may be 20 to 40 minutes. It will reduce the volume and weight of the organic MSW by 80% with no environmental pollution. The balance of the waste can be used for other products or commodities. The machine takes organic solid waste or garbage that usually goes to land fill or incineration and breaks down the product to solid fertilizer compost or humus/humate, bio fuel, and/or liquid (humic acid) compost tea/organic fertilizer in less than 45 minutes. How it works: Replica or Similar to the human digestive system except the output such as our solid excrement and urine have no foul smelling odors. The "Teeth" and "Mouth" (Pretreatment of the Solid Waste): We take the solid waste and run it through a shredder grinder to break it down to a smaller particle size and convert it to water pollution. The water is heated to 120 to 160 degrees F. which is the ideal temperature for different types of bacteria (microbes). The container is aerated. We add microbes to enhance the system but microbes are already present in the MSW. The system is recirculated on a chopper pump to create a finer particulate to feed the microbes by the seconds and minutes instead of hours. The "Esophagus" is our piping. It is valved off to re-feed the pretreatment tank or sent to the grinder for smaller particle size. The machine is seeded with Mesophiles, Thermophiles, and Hyperthermophiles microbes. The agitation in the tank helps the aerobic microbes multiply The materials can then be sent to the reactor ("Stomach"). The "Stomach": Inside the reactor we have a mixer that agitates the water pollution like a mixer. It has mixer paddles to mix everything up. We supply heated air (it runs through a heated water tank) at 5 to 20 psi to keep the microbes reproducing. The reactor is heated between 115 degrees to 160 degrees F., depending upon how much heat the microbes produce. The speed of rotation of the mixing paddles runs at 35 to 20 RPM. The reactor can be made any size and the motors can be any size. Compressed oxygen can be used similar to turbo charge the microbes. An Oxygen generator can be used. The tank is vented to remove off gas $CO_2$ and nitrogen. (CO2 can be collected or digested.) The reactor can run as a batch system or continuous system. On a system we add a screen (perforated metal) In sizes 3 mm to 20 mm. On a continuous system we add smaller screens. Further, it depends on the desired waste processing speed and the size of tonnage we need to process or the size of particulate desired. The screen also helps as an abrasive to give the bacteria new food as it scrapes the sides plus particle reduction. The particulate drops down to a slotted bottom which contains an auger that can turn at 20 to 40 RPM. Once the waste has been sitting in the tank for 20 to 40 minutes a gate valve is opened. The auger pushes out some waste. The digested waste comes out into the dewatering (similar to the "Kidneys"/"Colon"). The dewatering system takes the wet digested sludge and dewaters it through an auger that is placed in a tube operating at 10 to 22 RPM. The tube has a wire mesh or perforated metal which works like a filter to separate the solids to liquids. Solid output: The solids can be further dewatered by extending the tube or angle or hydraulic press or heated but it depends on how dry the customer needs are. Dewatering equipment used in waste water treatment can be used. Then out comes the solid waste compost humus or biofuel. Liquid output: The liquids are now collected in a tank with an automatic float switch, providing compost tea or humic acid. The liquid may be left to sit to convert to methane by going anaerobic.

The following examples are intended to illustrate, but not limit, the invention.

EXAMPLES

Example 1

2000 pounds of organic waste material, containing meat, fish, landscaping, vegetables, fruits, poultry, cardboard, newspaper, wood, used motor oil, and hydrocarbons were digested in a waste reduction system as described herein.

First the material was passed through a shredder. The shredded material was then conducted to a pre-digester that contained water at a temperature of 120-139 degrees F., oxygen at a level of up to about 50 ppm, and microbes. This pre-soak solution acted similarly to a wetting solution, wetting the solid waste so that it could travel through the piping of the waste reduction system. The waste material was mixed in the pre-digester for 10-15 minutes. The pre-digested material was then continuously fed into a bioreactor, where it was microbially digested under aerobic conditions at high temperature.

The bioreactor included an aggressive slurry mixing process that mixed the waste slurry from the pre-digester for 30 minutes. Additional microbes were added to the slurry in the bioreactor. The temperature in the bioreactor was 135 to 139 degrees F., and the oxygen concentration was 19 to 50 ppm, facilitating digestion of the waste material and maintaining an environment in which only microbes that grow aerobically at high temperatures can flourish. An abrasive mesh screen was located within the bioreactor to allow for a consistent particulate size, improving digestion of the waste material and providing a consistent particle size in the digested output.

After digestion in the bioreactor, solid and liquid materials were separated by transfer of the slurry to a dewatering auger system. Solid and liquid materials were separated through a fine mesh screen, allowing water to permeate through the screen while the solids were pushed through by the auger. Some or all of the separated liquid (e.g., 80-100%) may be transferred back to either pre-digestor or the bioreactor, packaged for use as liquid fertilizer, purified for use as drinking water or other uses, or discharged to the sewer. The solid output is compost ready but can be used for energy production as well.

400 pounds of solid output and 120 gallons of liquid output were produced. Volume and mass were reduced about 80% in comparison to the starting organic waste material. Volume and mass reduction can fluctuate depending on the nature of the starting material and/or desired moisture content of the solid output. The solid output looked similar to humate or organic compost, but might look different depending on the waste material used as input for the process.

The solid and liquid products were used as fertilizer for growth of roses, vegetables, plants, grasses, and landscaping. In most instances, the plants grew at an accelerated rate in comparison to growth in the absence of the solid or liquid fertilizer products. The solid waste material was also used as barbeque fuel and stayed heated like charcoal.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A method for processing organic waste material, comprising:
    (a) mixing an organic waste material with heated microbial pre-soak liquid in a pre-digester tank in the presence of $O_2$ and thermophilic and/or hyperthermophilic microbes, thereby producing a slurry, wherein the organic waste material is heated to a temperature of 115°-160° F. in the pre-digester;
    (b) conducting the slurry to a bioreactor, wherein the bioreactor comprises: (i) the organic waste material slurry; (ii) thermophilic and/or hyperthermophilic microbes that are capable of digesting the waste material; and (iii) $O_2$, wherein the temperature in the bioreactor is 115°-160° F.;
    (c) agitating the slurry in the bioreactor at a temperature that is suitable for growth of the microbes and for an amount of time that is suitable for the microbes to digest the waste material to produce digested waste material, wherein $CO_2$ is produced during the microbial digestion process; and
    (d) conducting the digested waste material to a separator system that separates liquids from solids, wherein solid digested waste material is separated from liquid in the separator system, wherein the solid digested waste material comprises a reduced mass and volume in comparison to the organic waste material that was provided in step (a).

2. A method according to claim 1, wherein the microbes that are capable of digesting the organic waste material are added in step (a) and/or step (b).

3. A method according to claim 1, wherein the digested waste material comprises compost, humus, humate, and/or biochar.

4. A method according to claim 1, wherein said organic waste material is digested in about 5 minutes to about 1 hour.

5. A method according to claim 1, wherein the organic waste material comprises wood, hydrocarbons, paper, fecal matter, landscape waste, meat, carbohydrates, proteins, food waste, plastic, and/or rubber.

6. A method according to claim 1, wherein the organic waste material is deconstructed prior to mixing in the pre-digester.

7. A method according to claim 1, wherein the organic waste material is heated to a temperature of 115°-135° F. in the pre-digester.

8. A method according to claim 1, wherein the organic waste material is agitated in the pre-digester for a length of time sufficient to carbonize at least a portion of the waste material.

9. A method according to claim 1, wherein the temperature in the bioreactor is 120°-155° F.

10. A method according to claim 1, wherein the digestion of the organic waste material in the bioreactor is conducted with mixing of the slurry and the microbes.

11. A method according to claim 1, wherein the bioreactor comprises an abrasion screen.

12. A method according to claim 1, wherein the pH in the bioreactor is regulated at about 3.0 to about 8.5.

13. A method according to claim 1, wherein nitrogen-containing byproduct is produced in and exhausted from the bioreactor.

14. A method according to claim 1, wherein $CO_2$ is exhausted from the bioreactor into a closed area for consumption by plants, into a tank for consumption by algae, or is compressed.

15. A method according to claim 1, wherein the separator system comprises a filter for recovery of microbes.

16. A method according to claim 1, wherein the solid material that exits the separator system is converted to pellets, gasified to produce syngas, burned to produce electricity, and/or converted to biofuel, landfill topping, sorbent, fertilizer, and/or fire logs.

17. A method according to claim 1, wherein the liquid exiting the separator system is filtered to produce water suitable for drinking or other uses.

18. A method according to claim 1, wherein one or more metals is recovered in the separator system.

19. A method according to claim 1, wherein microbes that are recovered in the separator system are recirculated back to the bioreactor and/or stored in a separate microbial reservoir.

20. A method according to claim 1, wherein the organic waste material is processed continuously.

* * * * *